US010853318B2

(12) United States Patent
Chan

(10) Patent No.: US 10,853,318 B2
(45) Date of Patent: Dec. 1, 2020

(54) METHOD AND SYSTEM FOR DISPLAYING AND INTERACTING WITH DIGITAL CONTENT STORED IN A COMPUTER SYSTEM UTILIZING CONCENTRIC INTERFACE

(71) Applicant: Inclr Limited, Hongkong (HK)

(72) Inventor: Ka Cheuk Chan, Hongkong (HK)

( * ) Notice: Subject to any disclaimer, the term of this patent is extended or adjusted under 35 U.S.C. 154(b) by 77 days.

(21) Appl. No.: 16/009,183

(22) Filed: Jun. 14, 2018

(65) Prior Publication Data

US 2018/0293252 A1 Oct. 11, 2018

Related U.S. Application Data

(63) Continuation of application No. PCT/CN2016/111332, filed on Dec. 21, 2016.

(30) Foreign Application Priority Data

Jan. 7, 2016 (HK) .................................. 16100125

(51) Int. Cl.
*G06F 9/48* (2006.01)
*G06F 16/16* (2019.01)
(Continued)

(52) U.S. Cl.
CPC .......... *G06F 16/168* (2019.01); *G06F 3/0482* (2013.01); *G06F 16/185* (2019.01);
(Continued)

(58) Field of Classification Search
CPC .... G06F 16/168; G06F 16/904; G06F 16/185; G06F 3/0482; G06F 3/0488; G06T 11/206
See application file for complete search history.

(56) References Cited

U.S. PATENT DOCUMENTS 8,887,079 B2 * 11/2014 Oh ...................... G06F 3/04886
715/764
2002/0113816 A1 * 8/2002 Mitchell ............... G06F 3/0481
715/734
(Continued)

FOREIGN PATENT DOCUMENTS

CN 102479028 A 5/2012
CN 104317487 A 1/2015

OTHER PUBLICATIONS

International Search Report of PCT/CN2016/111332 dated Mar. 17, 2017.

*Primary Examiner* — Jennifer N To
*Assistant Examiner* — K C Chen
(74) *Attorney, Agent, or Firm* — W&K IP

(57) ABSTRACT

A computer system including a memory module containing a plurality of electronic files, a processor unit configured for processing any one of the plurality of electronic files, and, a display; said memory module including a program stored thereon configured for execution by the processor to provide a graphical user interface operable on the display, the graphical user interface being configured for graphically representing on the display, in accordance with a first display mode, a representation of a hierarchical folder structure comprising at least one first-level folder and at least one second-level folder associated with the at least one first-level folder, and at least one of said plurality of electronic files being associated with at least one of the first-level folder and the second-level folder.

25 Claims, 15 Drawing Sheets

(51) Int. Cl.
    *G06F 16/185*     (2019.01)
    *G06F 16/904*     (2019.01)
    *G06F 3/0482*     (2013.01)
    *G06T 11/20*     (2006.01)
    *G06F 3/0488*     (2013.01)

(52) U.S. Cl.
    CPC .......... *G06F 16/904* (2019.01); *G06T 11/206* (2013.01); *G06F 3/0488* (2013.01)

(56) References Cited

U.S. PATENT DOCUMENTS

| | | | |
|---|---|---|---|
| 2003/0210284 A1* | 11/2003 | Vandruff | G06F 16/904 |
| | | | 715/853 |
| 2011/0055760 A1 | 3/2011 | Drayton | |
| 2013/0111406 A1 | 5/2013 | Gebhart et al. | |
| 2013/0339904 A1* | 12/2013 | Geithner | G06F 3/0482 |
| | | | 715/834 |
| 2014/0096083 A1* | 4/2014 | Kim | G06F 3/04842 |
| | | | 715/835 |
| 2015/0331589 A1* | 11/2015 | Kawakita | G06F 1/163 |
| | | | 715/834 |

* cited by examiner

METHOD AND SYSTEM FOR DISPLAYING AND INTERACTING WITH DIGITAL CONTENT STORED IN A COMPUTER SYSTEM UTILIZING CONCENTRIC INTERFACE

CROSS-REFERENCE TO RELATED APPLICATIONS

This application is a continuation of International Patent Application No. PCT/CN2016/111332 with a filing date of Dec. 21, 2016, designating the United States, now pending, and further claims priority to Hong Kong Patent Application No. 16100125.0 with a filing date of Jan. 7, 2016. The content of the aforementioned applications, including any intervening amendments thereto, are incorporated herein by reference.

TECHNICAL FIELD

The present invention relates to a method and system for displaying and interacting with digital content in a computer system.

BACKGROUND OF THE PRESENT INVENTION

Digital content stored in computer systems is generally displayed as a series of folders, sub-folders and lists of files typically as a tree or cascading folder structure. This display approach has been popularly utilised by virtue of its perceived flexibility, scalability and legibility. However, a disadvantage associated with this type of display system is that users tend to become lost within the seemingly endless hierarchical folder structure and the homogenous visual appearance of the folders and files contained therein. Moreover, in daily life, "active" or "live" content files such as web browser sessions, chat sessions, email strings and the like are becoming of growing importance to users. Whereas the traditional file display systems may be suitable for archiving "static" data files such as Word documents, excel files, PDFs, image files which may not need to be accessed regularly, these traditional content display systems tend to archive "live" and "active" content files in such a manner that they are not easily and conveniently retrievable as they need to be on a daily basis.

SUMMARY OF PRESENT INVENTION

The present invention seeks to alleviate at least one of the above-described problems.

The present invention may involve several broad forms. Embodiments of the present invention may include one or any combination of the different broad forms herein described.

In a first broad form, the present invention provides a computer system including:

a memory module containing a plurality of electronic files;

a processor unit configured for processing any one of the plurality of electronic files; and a display;

said memory module including a program stored thereon configured for execution by the processor to provide a graphical user interface operable on the display, the graphical user interface being configured for graphically representing on the display, in accordance with a first display mode, a representation of a hierarchical folder structure comprising at least one first-level folder and at least one second-level folder associated with the at least one first-level folder, and at least one of said plurality of electronic files being associated with at least one of the first-level folder and the second-level folder, the representation of the hierarchical folder structure including:

(i) a first indicia configured as a control interface for controllably navigating about and interacting with the hierarchical folder structure;

(ii) a second indicia indicative of the at least one first-level folder, the second indicia surrounding at least a portion of the first indicia on the display; and (iii) a third indicia indicative of the at least one second-level folder, the third indicia including at least one of a text and a graphic disposed substantially radially outwardly from a region of the first indicia represented on the display.

Preferably, the first indicia may include a circular shape.

Preferably, the first indicia may include a customisable image.

Preferably, the second indicia graphically representing the at least one first-level folder may include at least a portion of a circular-shape.

Preferably, the hierarchical folder structure may include a plurality of first-level folders, each of said plurality of first-level folders being graphically represented by the graphical user interface on the display by corresponding second indicias, and said corresponding second indicias being arranged to surround at least a portion of the respective first indicia on the display.

Preferably, the plurality of second indicias may be displayed in a substantially concentric formation relative to the respective first indicia.

Preferably, the graphical user interface may be configured to highlight a second indicia representing a first-level folder which is currently selected on the graphic user interface, the said highlight including at least one of scaling the second indicia representing the first-level folder currently selected and positioning the second indicia representing the first-level folder currently selected to an outer-most position within the concentric formation of second indicias relative to the first indicia.

Preferably, the display may include a touchscreen display, and a portion of the touchscreen display upon which the first indicia is represented may be configured to function as the user-interactive control interface responsive to touch-activated control inputs.

Preferably, the control interface, in response to a sensed user-control input, may be configured to allow navigation about the at least one first-level folder and the at least one second-level folder of the hierarchical folder structure represented by the second indicia and third indicia respectively on the display, and to allow processing of at least one of the plurality of electronic files associated with at least one of the first-level folder and the at least one second-level folder during navigation, whereby said processing includes processing the at least one electronic file via a compatible program executable by the processor.

Preferably, the graphical user interface may be configured for graphically representing on the display a plurality of representations of hierarchical folder structures each comprising at least one first-level folder and at least one second-level folder associated with the at least one first-level folder, at least one of said plurality of electronic files being associated with at least one of the first-level folder and the second-level folder, each of said plurality of hierarchical folder structures including coordinates associated therewith for defining locations of the representations of the hierarchical folder structures relative to a virtual space; and a grouping module configured for defining, by reference to a grouping criteria, a group relationship between at least a first and a second representation of a hierarchical folder structure from amongst the plurality of representations of hierarchical folder structures:

wherein the grouping criteria includes at least one of:

(i) the coordinates defining the locations of the first and second representations of hierarchical folder structures in the virtual space meeting a threshold proximity relative to each other; and (ii) content associated with the hierarchical folder structures represented by the first and second representations meeting a matching threshold.

Preferably, the graphical user interface may be configured for graphically representing on the display, in accordance with a second display mode, a representation of the group relationship defined by the grouping module between the first and second representations of the hierarchical folder structures, including at least one of:

(i) a line or graphic disposed between the first and the second representations of the hierarchical folder structures on the display;

(ii) the first and the second representations of the hierarchical folder structures being positioned in relative proximity to each other;

(iii) the first and the second representations of the hierarchical folder structures being displayed with common visual characteristic including at least one of a common colour and a common size.

Preferably, when operating in the second display mode the first and second representations of the hierarchical folder structures defined in the group relationship may be represented in a relatively collapsed form on the display and are able to be user-selected via the graphical user interface, whereby in response to user selection, the graphical user interface is configured to switch to the first display mode whereby the selected first and second representations of the hierarchical folder structures are represented in a relatively expanded form.

Preferably, the present invention may be embodied in a mobile computing device including at least one of a smartphone, a laptop computer, and a tablet-type computing device.

Typically, the present invention may be configured wherein:

(i) the graphical user interface is configured to allow user-interactive dragging of at least one of the second indicia, the third indicia, and an indicia representing at least one of the plurality of electronic files in to proximity with the first indicia; and (ii) the processor unit is configured for performing a processing function upon the content represented by the at least one of the second indicia, the third indicia, and the indicia representing at least one of the plurality of electronic files that is dragged in to proximity with the first indicia whereby the processing function that is performed includes a function that is represented by an icon, text, image, or symbol displayed by the first indicia.

In a further broad form, the present invention provides a display method for use on a computer system, the computer system including:

a memory module containing a plurality of electronic files;

a processor unit configured for processing any one of the plurality of electronic files; and a display;

wherein the method includes the processor executing a program stored in the memory module to provide a graphical user interface operable on the display, the graphical user interface being configured for graphically representing on the display, in accordance with a first display mode, a representation of a hierarchical folder structure comprising at least one first-level folder and at least one second-level folder associated with the at least one first-level folder, and at least one of said plurality of electronic files being associated with at least one of the first-level folder and the second-level folder, the representation of the hierarchical folder structure including:

(i) a first indicia configured as a control interface for controllably navigating about and interacting with the hierarchical folder structure;

(ii) a second indicia indicative of the at least one first-level folder, the second indicia surrounding at least a portion of the first indicia on the display; and (iii) a third indicia indicative of the at least one second-level folder, the third indicia including at least one of a text and a graphic disposed substantially radially outwardly from a region of the first indicia represented on the display.

Preferably, the first indicia may include a circular shape.

Preferably, the first indicia may include a customisable image.

Preferably, the second indicia graphically representing the at least one first-level folder may include at least a portion of a circular-shape.

Preferably, the hierarchical folder structure may include a plurality of first-level folders, each of said plurality of first-level folders being graphically represented by the graphical user interface on the display by corresponding second indicias, and said corresponding second indicias being arranged to surround at least a portion of the respective first indicia on the display.

Preferably, the plurality of second indicias may be displayed in a substantially concentric formation relative to the respective first indicia.

Preferably, the graphical user interface may be configured to highlight a second indicia representing a first-level folder which is currently selected on the graphic user interface, the said highlight including at least one of scaling the second indicia representing the first-level folder currently selected and positioning the second indicia representing the first-level folder currently selected to an outer-most position within the concentric formation of second indicias relative to the first indicia.

Preferably, the display may include a touchscreen display, and a portion of the touchscreen display upon which the first indicia is represented may be configured to function as the user-interactive control interface responsive to touch-activated control inputs.

Preferably, the control interface, in response to a sensed user-control input, may be configured to allow navigation about the at least one first-level folder and the at least one second-level folder of the hierarchical folder structure represented by the second indicia and third indicia respectively on the display, and to allow processing of at least one of the plurality of electronic files associated with at least one of the first-level folder and the at least one second-level folder during navigation, whereby said processing includes processing the at least one electronic file via a compatible program executable by the processor.

Preferably, the graphical user interface may be configured for graphically representing on the display a plurality of representations of hierarchical folder structures each comprising at least one first-level folder and at least one second-level folder associated with the at least one first-level folder, at least one of said plurality of electronic files being associated with at least one of the first-level folder and the second-level folder, each of said plurality of hierarchical folder structures including coordinates associated therewith for defining locations of the representations of the hierarchical folder structures relative to a virtual space; and a grouping module configured for defining, by reference to a grouping criteria, a group relationship between at least a first and a second representation of a hierarchical folder structure from amongst the plurality of representations of hierarchical folder structures:

wherein the grouping criteria includes at least one of:

(i) the coordinates defining the locations of the first and second representations of hierarchical folder structures in the virtual space meeting a threshold proximity relative to each other; and (ii) content associated with the hierarchical folder structures represented by the first and second representations meeting a matching threshold.

Preferably, the graphical user interface may be configured for graphically representing on the display, in accordance with a second display mode, a representation of the group relationship defined by the grouping module between the first and second representations of the hierarchical folder structures, including at least one of:

(i) a line or graphic disposed between the first and the second representations of the hierarchical folder structures on the display;

(ii) the first and the second representations of the hierarchical folder structures being positioned in relative proximity to each other;

(iii) the first and the second representations of the hierarchical folder structures being displayed with common visual characteristic including at least one of a common colour and a common size.

Preferably, when operating in the second display mode the first and second representations of the hierarchical folder structures defined in the group relationship may be represented in a relatively collapsed form on the display and are able to be user-selected via the graphical user interface, whereby in response to user selection, the graphical user interface is configured to switch to the first display mode whereby the selected first and second representations of the hierarchical folder structures are represented in a relatively expanded form.

Typically, the present invention may provide the following steps of:

(i) allowing user-interactive dragging via the graphical user interface of at least one of the second indicia, the third indicia, and an indicia representing at least one of the plurality of electronic files in to proximity with the first indicia; and (ii) the processor unit performing a processing function upon the content represented by the at least one of the second indicia, the third indicia, and the indicia representing at least one of the plurality of electronic files that is dragged in to proximity with the first indicia; whereby the processing function that is performed includes a function that is represented by an icon, text, image, or symbol displayed by the first indicia.

DESCRIPTION OF THE DRAWINGS

The present invention will become more fully understood from the following detailed description of a preferred but non-limiting embodiments thereof, described in connection with the accompanying drawings, wherein.

DETAILED DESCRIPTION OF PREFERRED EMBODIMENTS

Preferred embodiments of the present invention will now be described with reference to FIGS. 1 to 10. For illustrative purposes, the embodiments are described herein as being configured for operation on a smartphone or other portable computing device. However, it would be understood that alternative embodiments of the present invention may be configured for implementation on other types of systems and devices including those of both a portable and non-portable nature.

Figure 1:
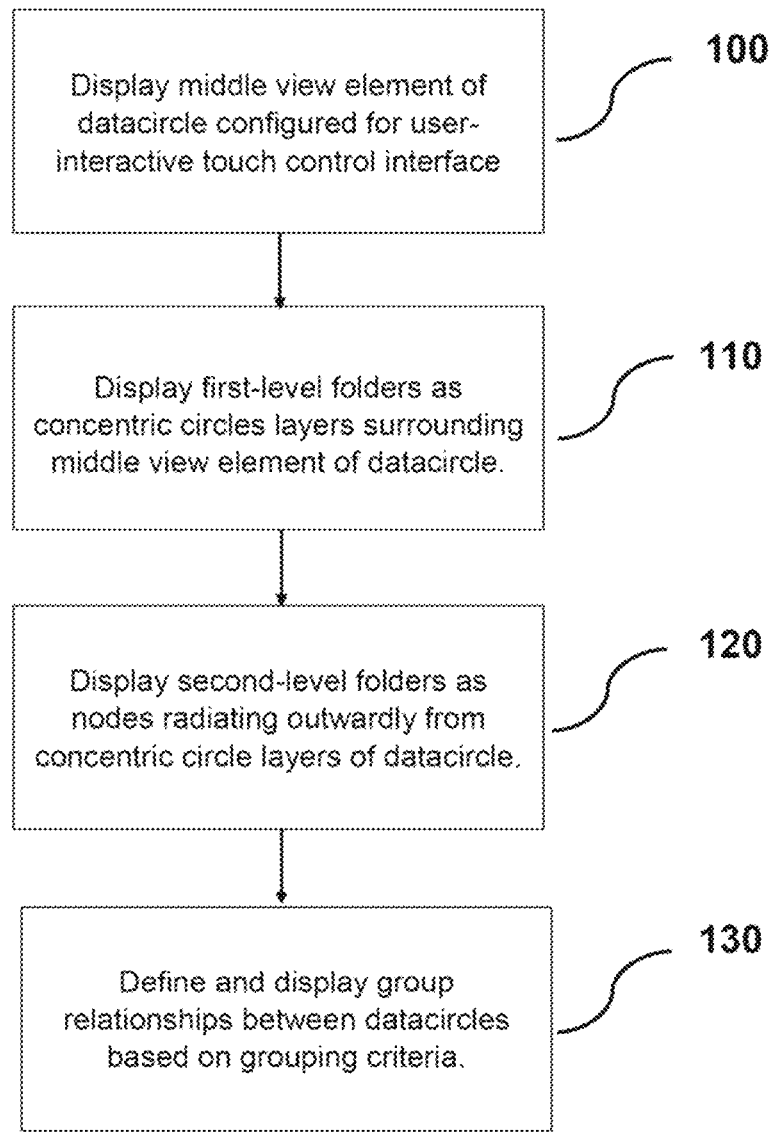
FIG. 1 shows a functional block diagram of a computer system in accordance with an embodiment of the present invention.
Figure 2:
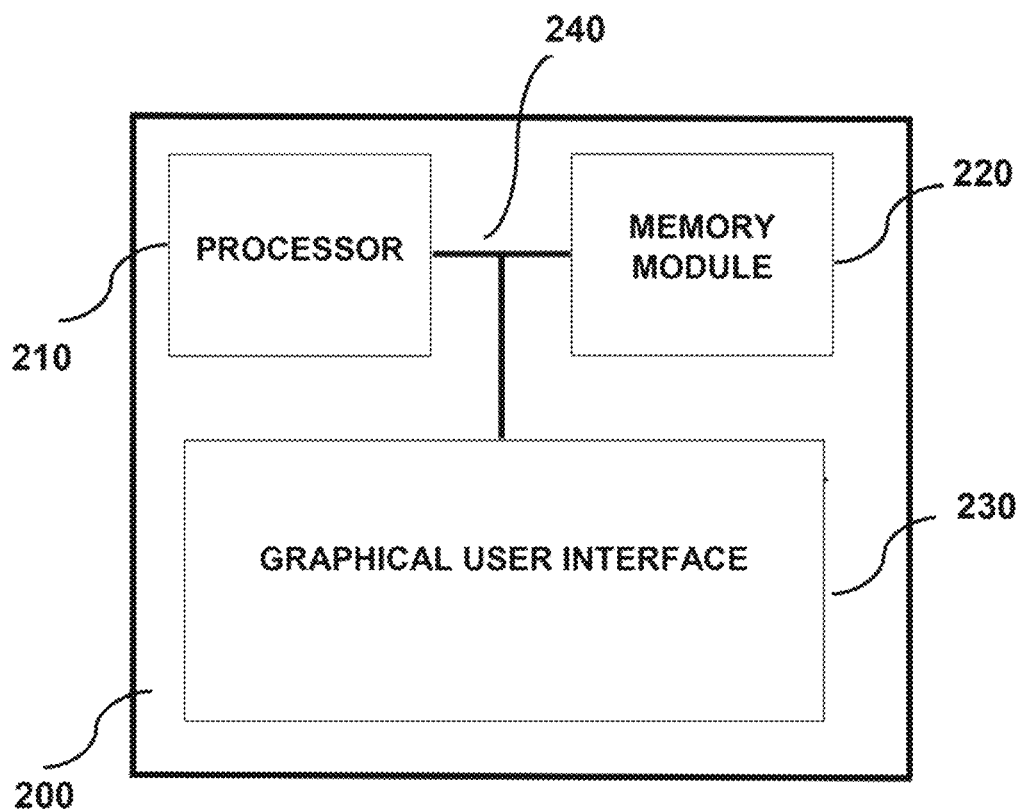
FIG. 2 shows a flow diagram of method steps operable using a computer system in accordance with an embodiment of the present invention.
Figure 3:
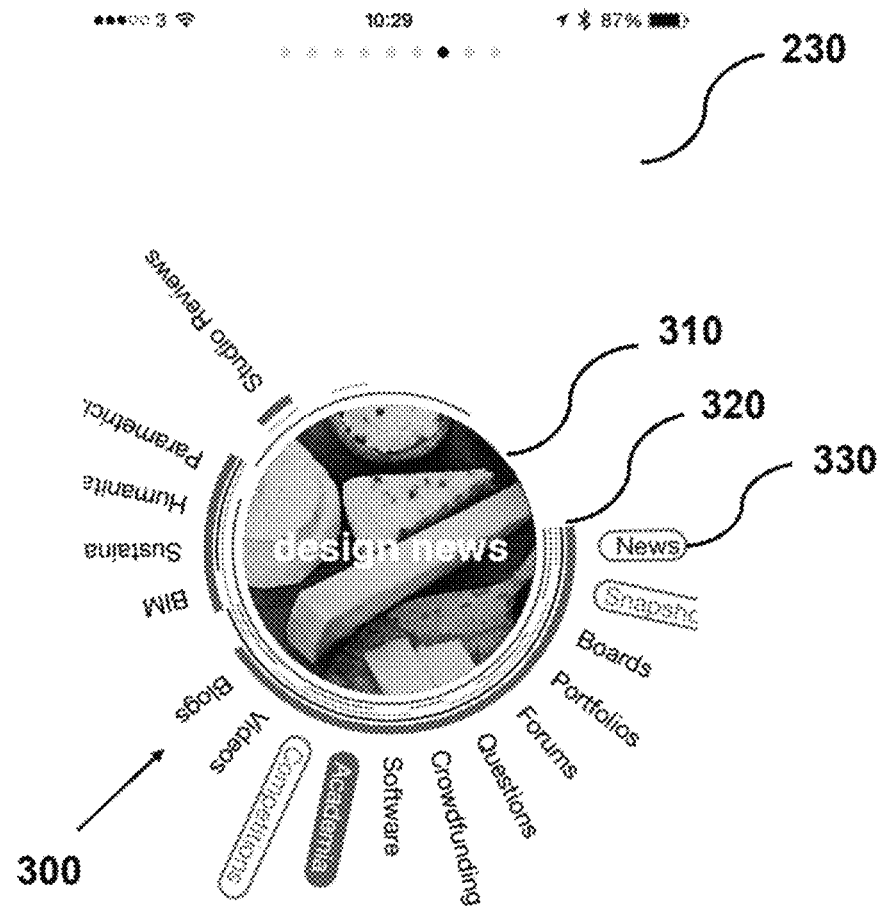
FIG. 3 shows an example of a datacircle representing a hierarchical folder structure comprising layers, nodes and entries, in accordance with an embodiment of the present invention wherein a first layer of the example datacircle is shown selected with its nodes displayed.

An embodiment of the present invention is shown in FIG. 2 embodied in a smartphone device (200) having a processor unit (210), a memory module (220), and a touchscreen display (230), and a communication system (240) operably connecting the processor unit (210), memory module (220) and touchscreen display (230). The memory module (220) includes a computer program stored thereon that is executable by the processor (210) to provide a graphical user interface operable on the touchscreen display (230) configured for displaying and allowing user interaction with a hierarchical folder structure and content associated with various folders within the hierarchical folder structure. The hierarchical folder structure, its first-level folders, second-level folders and contents associated therewith are defined by a database module stored which may also be stored in the memory module (220) (or which may be stored on an external server remotely accessible by the smartphone device (200)).

As shown in FIGS. 3 to 6, the graphical user interface is configured to display a representation of the hierarchical folder structure in the form of a graphical element which will be referred to hereafter as a "datacircle" (300). The datacircle collectively represents a control interface (310) (shown as a first indicia and hereafter also referred to as the "middle view element") to allow navigation about and interaction with elements of the datacircle (300), a set of first-level folders (shown as second indicias and hereafter referred to as "layers"), second level folders (shown as third indicias and hereafter referred to as "nodes") which are for instance sub-folders of the first-level folders, and electronic data and program files (hereafter referred to as "entries") stored in or otherwise associated with the various layers (320) and nodes (330). The layers (320) and nodes (330) are analogous to two-levels of nested sub-folders whereby the layers (320) are sub-folders of the datacircle and the nodes (330) are sub-folders of the layers (320) much like in a zip-archive type data structure. The steps of representing the various graphical elements of the datacircle (300) including the middle view element (310), layers (320), nodes (330), entries, as well as the step of defining and representing groups of datacircles (300) is shown in the flow diagram of FIG. 1 and further described in the following text.

In this embodiment, the layers (320) associated with the datacircle (300) are represented by the concentric circles (or partial circles) as shown in FIGS. 3 to 6. In this example, five concentric circles (320) are displayed each of which represents a different layer associated with the datacircle (300). In alternative embodiments, the graphical elements comprising the datacircle (300) may not necessarily be circles but may for instance resemble any two-dimensional or three-dimensional configuration including squares, triangles, hexagons, and need not necessarily be arranged concentrically in the datacircle (300) (e.g. they may be cascading or floating graphical elements).

The nodes (330) that are associated with each of the different layers are represented by text and/or icon graphical elements which are configured for display as radiating outwardly away from the concentric circular-shaped layers (320). In this embodiment, only the nodes (330) of a layer (320) that is currently selected by the user on the graphical user interface (230) will be visibly displayed by the graphical user interface (230) at any given time so as to alleviate potential over-cluttering of content displayed on the touchscreen display.

When a node (330) is selected by the user via the graphical user interface (230), the entries that are associated with the node (330) are configured to be displayed to the user by the graphical user interface (230). For instance, the graphical user interface (230) may be configured display a listing of all entries associated with the selected node (330) in a pop-up window on the display, or, the entries may be configured to be displayed as text and/or icons radiating outwardly from the concentric circles (320) of the datacircle (300). Alternatively, the entries associated with a node (330) may be displayed in scrolling format in the centre region of the datacircle (300) that are surrounded by the concentric circular-shaped layers (320). Each of the entries may comprise a program or data file (e.g. a text document, image, video etc) which when selected by the user via the graphical user interface (230), the graphical user interface (230) is configured to open the entry in an software application executable by the processor unit (210) that is compatible with the selected entry type. For instance, the selected entry may be a PDF document, a URL bookmark, or a chat session data file, in which case the graphical user interface is configured to cause the processor to load and execute a PDF reader, Web browser or chat application respectively for display and interaction with the relevant entry type.

The maximum number of layers (320), nodes (330) and entries that are associated with a datacircle (300) may vary depending upon the technical specifications of the device that the graphical user interface (230) will be operable on. In the case of a smartphone or other mobile computing device, the number of layers, nodes and entries that may be displayable may be relatively limited compared to embodiments utilizing a desktop computer for instance due to memory and processor power capacity. By way of example only, in the example datacircle shown in FIGS. 3 to 6, if we consider that there are 5 layers, 17 radiating nodes per layer, and an average of 5 entries per node, the datacircle may potentially represent up to 425 entries comprising data and program files. Embodiments of the present invention are theoretically designed to accommodate a virtually infinite number of layers, nodes and entries. When there are for instance 100 or more nodes utilized in a given datacircle, the density of the data represented around the datacircle by the nodes may conveniently create a graphic that serves as a data chart/infographic for showing complex information. Accordingly, datacircles (300) may can exhibit information and graphically represent information in various ways in response to a variety of use cases, depending on how many layers or nodes are shown, as appropriate for the use case. FIG. 10 shows different example layouts of datacircles (300) having different numbers and visual representations of nodes (330) which may vary depending upon the users requirements.

The graphical user interface (230) is also configured to automatically vary the size, shape and visibility of the graphical elements representing the layers (320), nodes (330) and entries of the datacircle (300) depending upon the number of layers (320), nodes (330) and entries associated with the datacircle (300). By way of example, in this embodiment, the graphical user interface is configured to display layers, nodes and entries in accordance with at least the following predetermined display rules:

where there are less than 12 nodes associated with a layer of the datacircle, relatively larger circular-shaped nodes are displayed containing a graphic icon;

where there is only 1 layer, no circle layers are displayed in the datacircle.

where there are between 12 to 20 nodes, relatively smaller rounded-square shaped nodes are displayed. Additional empty nodes are added at end of circular list to provide a beginning and end.

where there are over 20 nodes, relatively long thin nodes are displayed. The nodes comprise text instead of icons. Additional empty nodes are added at end of circular list to provide a beginning and end.

Figure 10A:
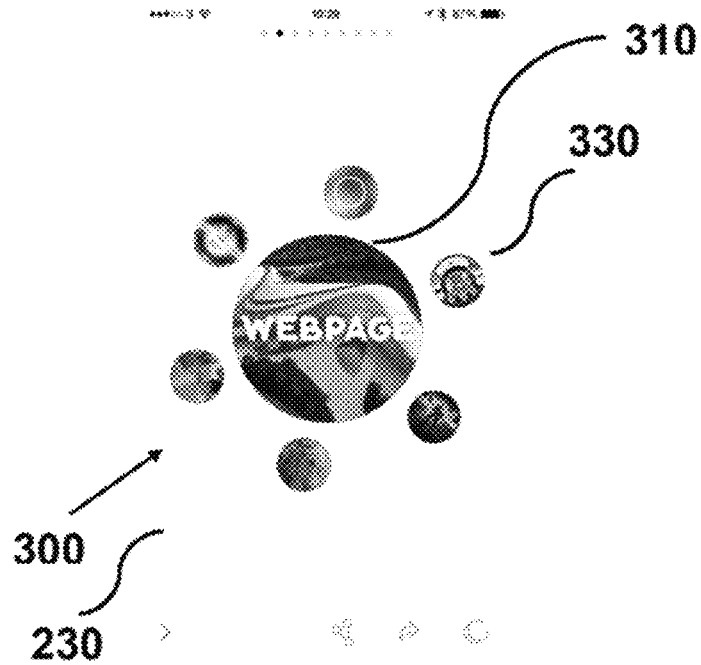
FIGS. 10A-10C depicts a series of example screenshots of the graphical user interface of an embodiment of the present invention which illustrates that the representation of the layers and nodes flexibly and dynamically vary to suit the display parameters as the user adds more information associated with the datacircle structure.
Figure 10B:
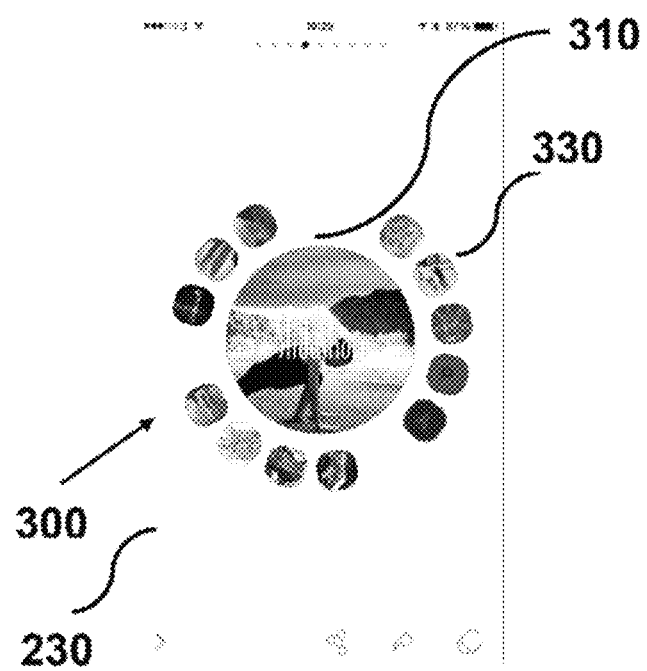
Figure 10C:
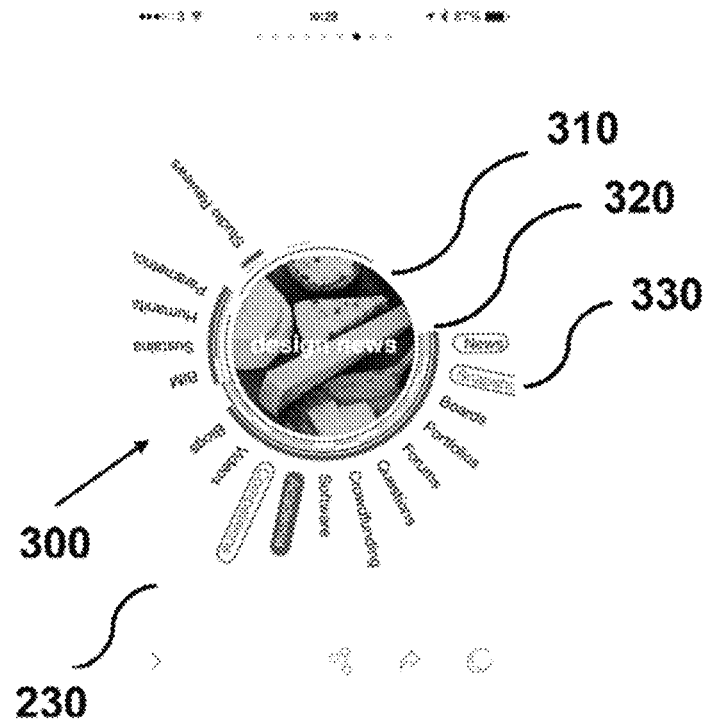

FIGS. 10A, 10B and 100 show examples of how the appearance of the layers and nodes of a datacircle may dynamically vary to suit the display parameters as the number of layers and nodes changes. In FIG. 10A a datacircle is depicted initially representing a single layer and a relatively small number of nodes (330). In accordance with the display rules for this embodiment, a circular-shaped icon representing the single layer is not shown in surrounding the middle-view element (310) and the nodes (330) are able to be represented as relatively large circular-shaped icons (330). Referring to FIG. 10B, the datacircle (300) still comprises a single layer but now represents a relatively larger number of nodes associated with the single layer (320). The relatively larger number of nodes (330) are now depicted as circular-shape node icons having relatively smaller dimensions compared to the smaller number of circular-shaped node icons in FIG. 10A. Now, in FIG. 100, the datacircle represents multiple layers which, in accordance with the display rules for this embodiment, are depicted as concentric circular-shaped layers (320) surrounding the middle-view element (310). Each of the layers (320) comprises a relatively larger number of nodes than in FIG. 10B and the nodes (330) are now depicted predominantly as text strings disposed radially relative to the datacircle (300) which more suitably fits within the display parameters.

Furthermore, the graphical user interface (230) may be configured to automatically vary the appearance of the layers (320), nodes (330) and entries in accordance with a predetermined display protocol depending upon whether the layers (320), nodes (330) and entries meet certain criteria. In another example, as shown in FIGS. 3 to 6, the graphical elements representing the nodes (330) may be varied in terms of the font style/size/colour, in terms of whether the text is surrounded by a border or not, in terms of whether the text includes background shading or not, and so on. By way of example, such variations in the visual appearance of the nodes (330) may conveniently provide a more immediate visual indication to the user as to whether for instance the node (330) is empty or contains entries, whether the entries associated with the node (330) exceeds a threshold level, whether the entries associated with the node are of a certain file type, the degree of frequency with which the particular node is accessed by the user, and so on.

As shown in FIGS. 3 to 6, a circular-shaped graphical element (310) (hereafter referred to as the "middle view element") is disposed at the centre of the datacircle (300) surrounded by the 5 concentric circles (320) representing the layers (320). The middle view element (310) is configured to provide various functions including (i) providing an ornamental or decorative function; (ii) providing indicia which is indicative of a theme or motif of content associated with the datacircle; and (iii) providing a navigation and control interface for the user to navigate, orient and interact with layers (320), nodes (330) and entries associated with the datacircle (300). In the example datacircle (300) shown in FIGS. 3 to 6, the middle view (310) comprises a static image however in other embodiments, the middle view element may comprise text, video, and any combination thereof. The graphical user interface (230) may also be configured to allow user-customisation of the middle view element (310)—for instance, by allowing customisation of the colour or graphical content of the middle view element (310). The specific colours of the middle view elements (310) of the datacircles (300) tend to provide more readily visible memory cues to the user regarding the nature and theme of content associated with the various datacircles (300).

The region of the touchscreen occupied by the middle view element (310) is configured to sense user-interactive input control gestures such as swiping, tapping, rotating, scrolling, pinching, panning, and in response to the sensed input control gestures, navigate about the layers (320), nodes (330) and entries of the datacircle (300), orienting the nodes (330) and entries (for instance, by rotating the nodes around the middle view element) or selecting and opening a layer, node or entry. Some non-exhaustive examples of how the middle view element (310) navigation and control interface may be implemented will be described as follows for illustrative purposes.

Rotational Control Mechanism

The rotation mechanism is implemented by converting the scrolling behaviour that is inherent in Apple's UIScrollView framework which is used typically to display lists of information such as contacts and addresses etc. The datacircle dial mechanism allows a user to rotate the nodes around the layers, by converting the location, acceleration and deceleration data extracted from UIScrollview and converting this data to radians which allows the dial to spin. The UIScrollView is first programmed to create an infinitely scrolling loop whereby once the end point is reached in an X or Y direction, it is reset to the start point. The same configuration is performed in the reverse direction with the resultant effect that from any direction, the UIScrollView appears to scroll endlessly. When the locational point is almost at the end, it resets to the start point so as to provide a smoother scrolling effect. Thereafter, the next step is to capture the scrolling and touch data from the UIScrollView and to convert this in to rotational acceleration and deceleration. The key points to consider in this regard are:

when the user's finger is touching the control interface disposed in the middle view element of the datacircle, it instigates the acceleration and direction. This direction is calculated in a manner that works around a circle as positive and negative values in Cartesian coordinates tend not to translate well in a circular coordinate system. Hence a series of equations are utilized to calculate the start angle and the end angle of the touch to the centre of the circle, and results in positive/negative values in radians. This value determines the direction of the touch swipe;

a separate calculation is performed to determine distance travelled from the start and end of touch gesture. This distance is combined with a positive/negative directional value to rotate clockwise or anti-clockwise; and once the finger is released, UIScrollview keeps scrolling to give the effect of inertia or momentum. The dial captures this locational data and converts it in to radians to continue spinning the dial.

In this embodiment, the middle view element (310) acting as the control interface of the datacircle (300) also allows scrolling up and down of graphical elements associated with the datacircle (300) and may thereby result in potential conflict with the dialing rotation mechanism of the datacircle (300).

In order to alleviate this potential conflict, a series of configurations and conditions are programmed in to the processor unit (210) to govern when capture user-input touches are to allow rotation or scrolling of graphical elements of the datacircle. All gestures are configured so that the touch of the user's finger may be simultaneously recognised when there are multiple gestures. Conditions are implemented in order to conflict arising may include for instance:

when swiping to rotate the dial, panning between data circles is prevented;

when touch begins inside the concentric circles, rotating of the graphical elements of the datacircle is prevented;

when touch begins outside concentric circles, panning of the middle view element is prevented; and when "map view" (to be described further below) is zoomed out to a certain value, scrolling within datacircles is prevented to avoid accidental scrolling and opening.

Swiping Control Mechanism

The middle view element is also configured to respond to swiping control gestures input by the user in order to navigate amongst layers within the datacircle. When the user's finger first touches a point in the middle view element, the initial touch location is captured and once a threshold distance of swiping motion across the touchscreen is sensed relative to the initial touch location, the selected layer changes. The speed of the layer change is also configured to change by reference to measurement of the velocity of the swipe. In implementing the swiping control mechanism in this particular embodiment, the user's initial finger contact is required to fall within the concentric circles so that the swipe gesture does not conflict with the rotating dial gestures. In order for the layer to not "over" change i.e. to restrict it to change layer at a time, a Boolean switch is used to make sure no layer changes while its already changing.

Figure 4:
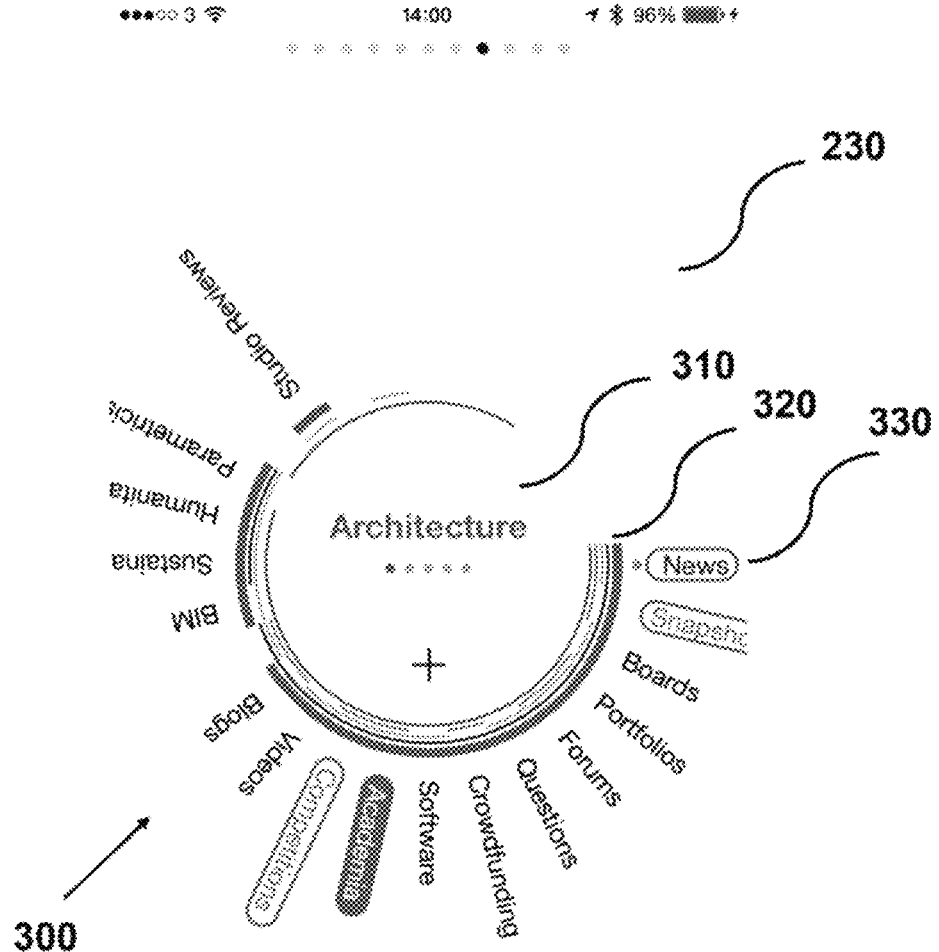
FIG. 4 shows the example datacircle of FIG. 3 wherein a second layer of the datacircle is shown selected with its nodes displayed.
Figure 5:
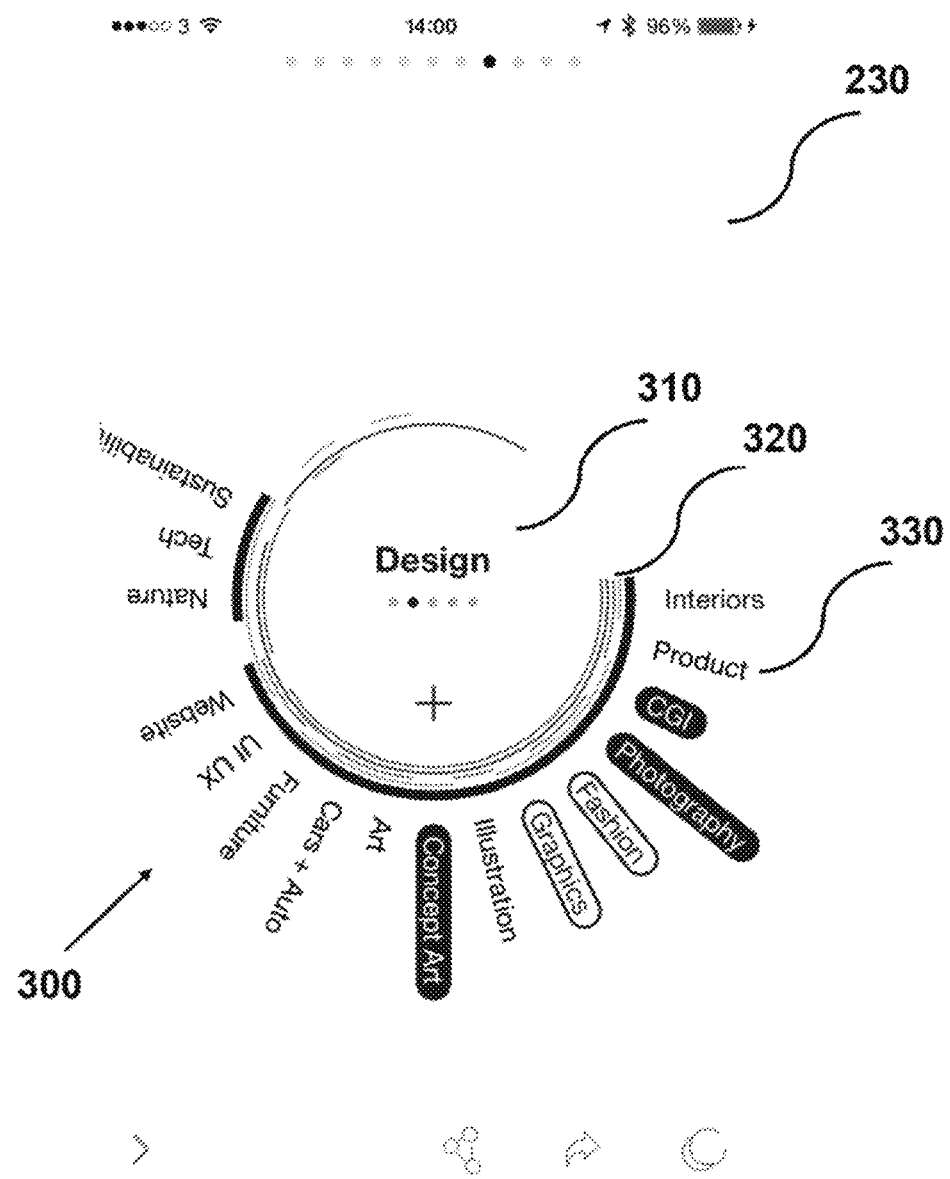
FIG. 5 shows the example datacircle of FIG. 3 wherein a third layer of the datacircle is shown selected with its nodes displayed.
Figure 6:
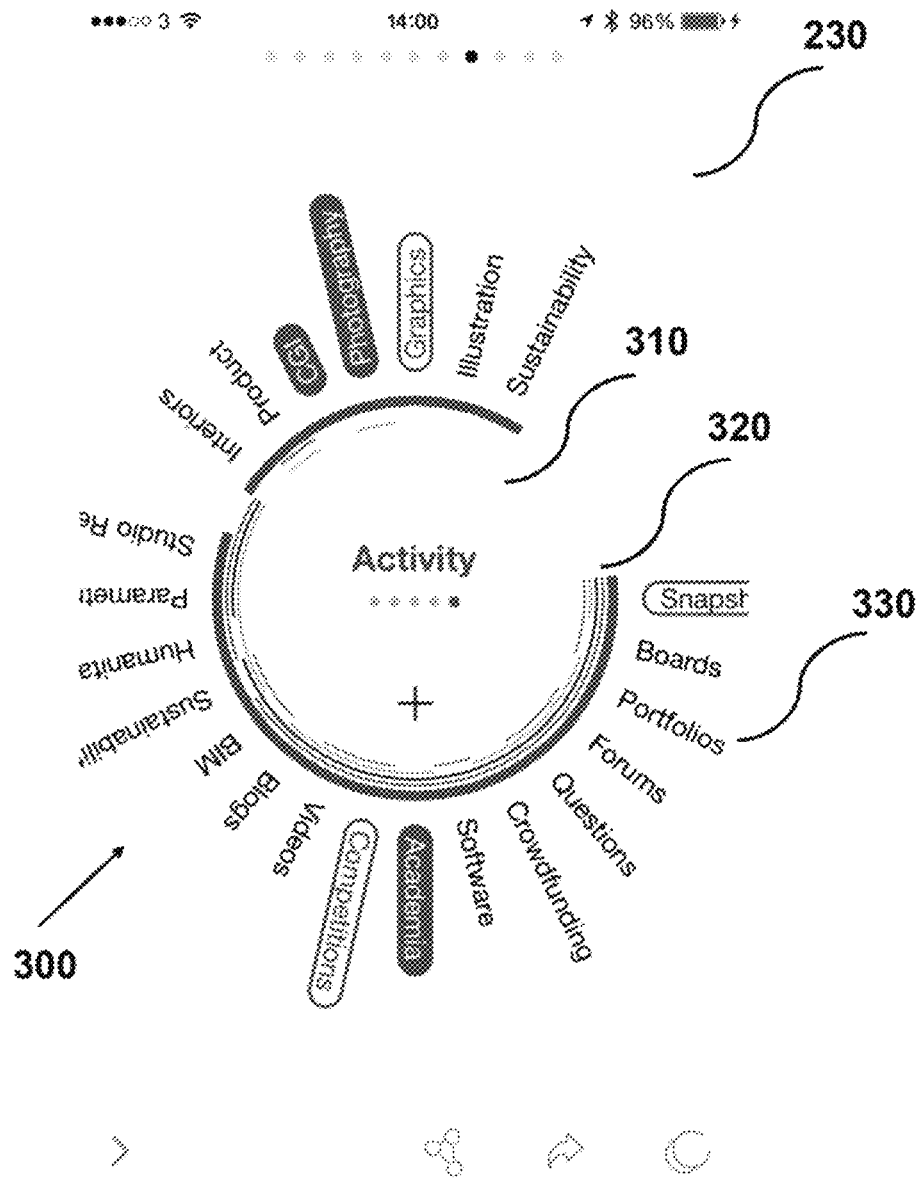
FIG. 6 shows the example datacircle of FIG. 3 wherein a fourth layer of the datacircle is shown selected with its nodes displayed.

When the layer changes, the concentric circle representing the newly and currently selected layer is scaled (or otherwise highlighted in some manner) in order to provide a visual indication that it is the current layer. Every layer change pushes the inner circle to the outer edge of the concentric circular-shaped layered so as to represent the current layer, and vice versa to represent that particular layer is no longer current. The way it does this is by first scaling the circle representing the currently selected layer and repositioning the circle representing the currently selected layer to correct the centre point after it has been scaled. FIGS. 4, 5 and 6 shows how a user is able to progressively navigate about the different layers (320) of the datacircle (300) from an inner circular-shaped layer towards an outer circular-shaped layer in response to the user swiping the control interface (310). As the user swipes the control interface in a right-handed direction, the navigation switches progressively from one layer (320) to the next and as each layer (320) is navigated to in sequence, the circular-shaped representing the currently selected layer is highlighted and the nodes (330) associated with the currently selected layer are displayed. Swiping the control interface (310) in the reverse direction progressively switches backwards through circular-shaped layers.

FIGS. 8A to 8D illustrate how the control interface disposed in the region occupied by the middle view element (310) can be readily switched to present different tools to the user. In this case, a Dropbox login, a pedometer, a GR Code, and fingerprint lock interface are presented to the user in the middle view element of the datacircle.

Figure 7:
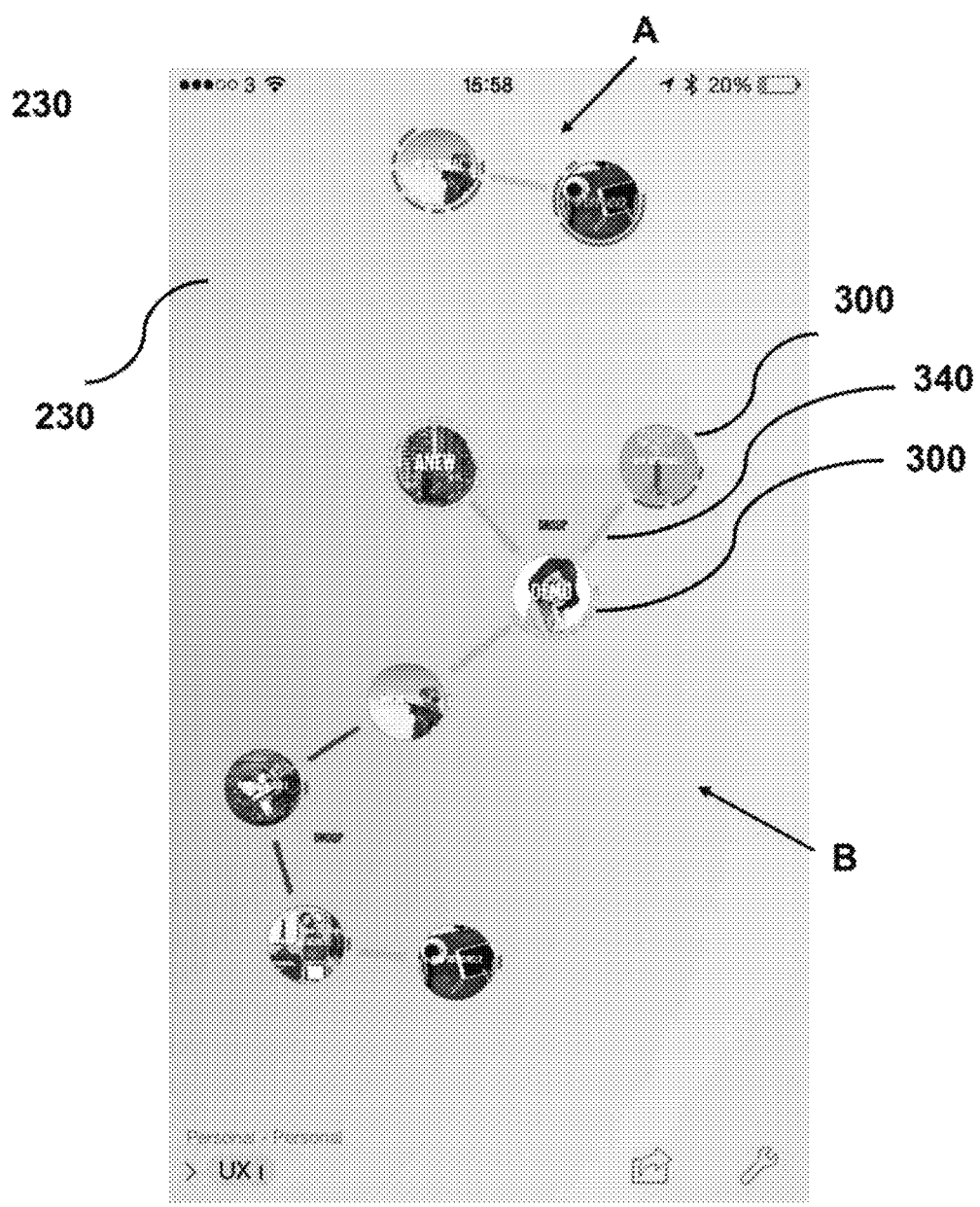
FIG. 7 shows the graphical user interface operating in a map view display mode representing group relationships between groups of datacircles that have been defined by a grouping module in accordance with an embodiment of the present invention.
Figure 8A:
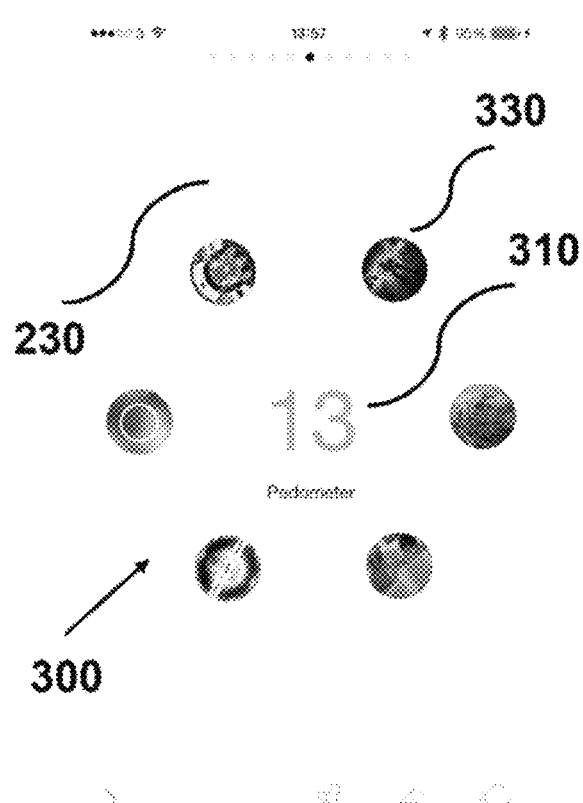
FIGS. 8A to 8D shows how the appearance of the middle view element of the datacircle can be changed to present different tools for use by a user, in accordance with an embodiment of the present invention.
Figure 8B:
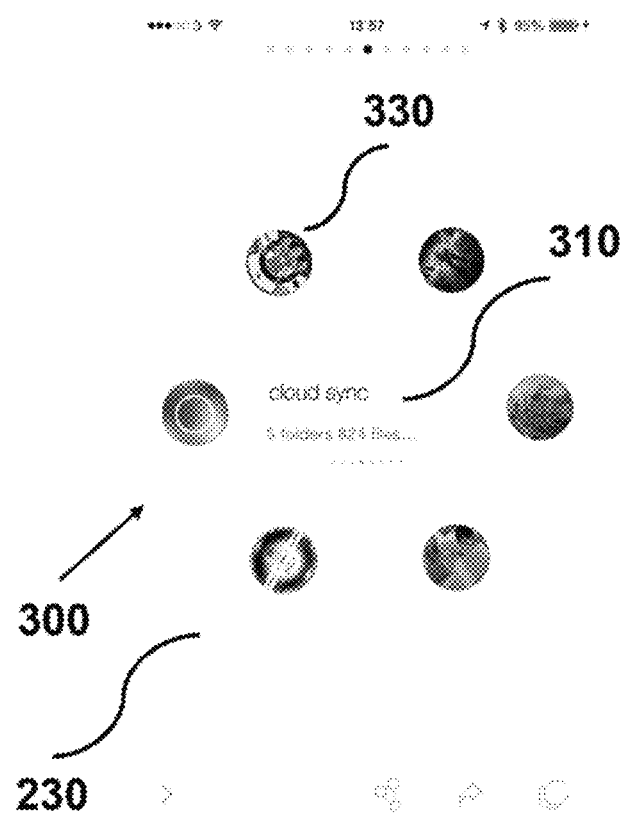
Figure 8C:
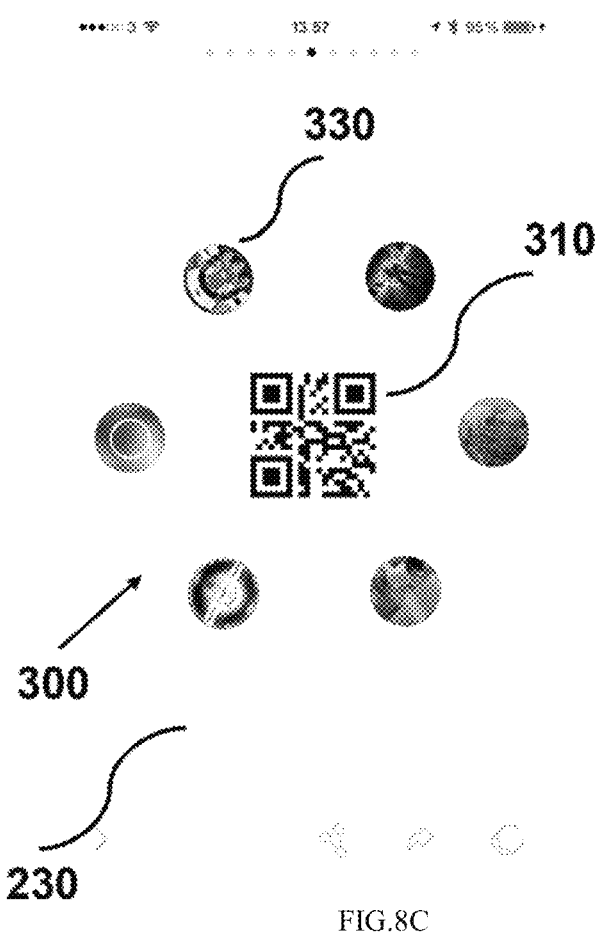
Figure 8D:
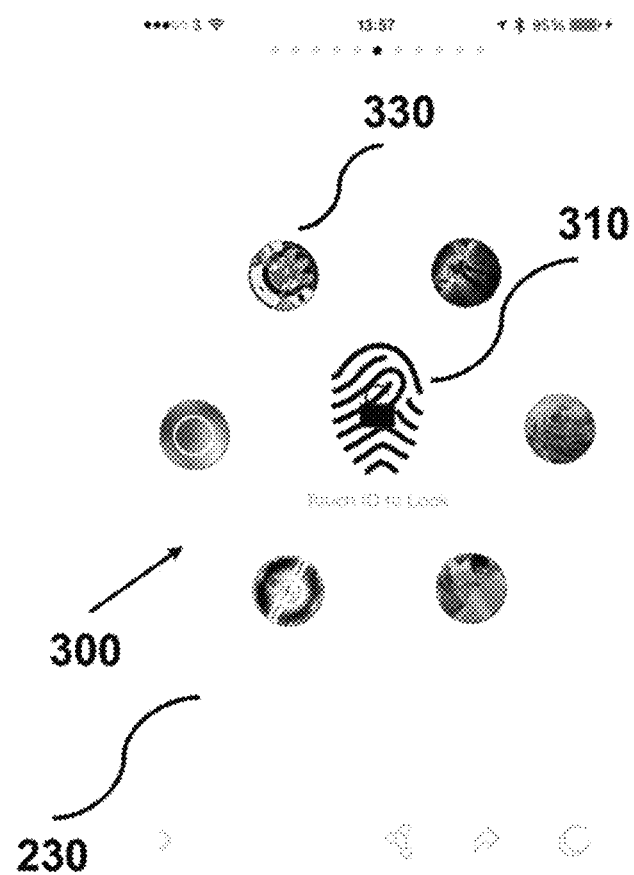
Figure 9:
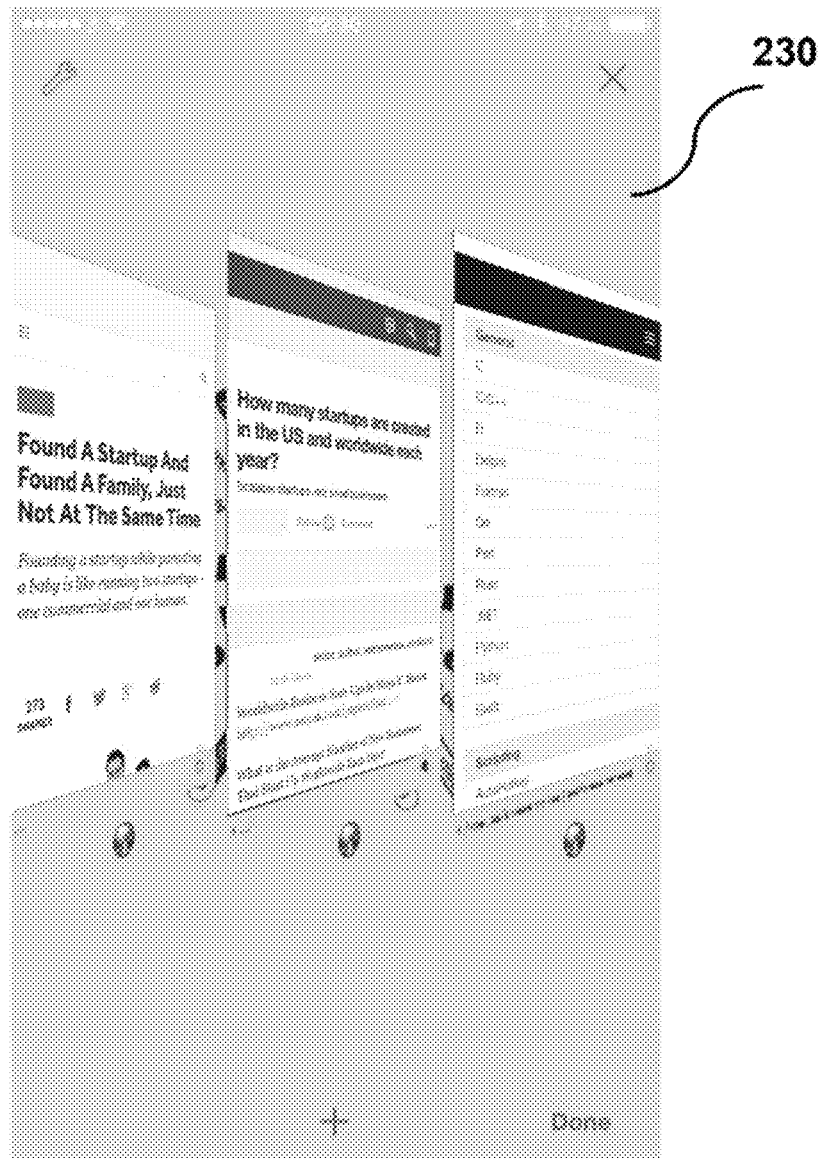
FIG. 9 illustrates how a variety of different digital content may be viewed using an embodiment of the present invention and how the different digital content may be reordered by dragging left or right the content frame in analogous manner to re-ordering a stack of paper.

Embodiments of the present invention are also be configured to operate in a "map view" whereby a plurality of different datacircles (300) are configured for display by the graphical user interface (230) on the touchscreen and each of the datacircles (300) is assigned coordinates defining locations of the hierarchical folder structures represented by the datacircles (300) relative to a virtual space. An example of the map view display mode operable on the smartphone touchscreen display is shown in FIG. 7 in which 2 groups (A,B) of datacircles (300) are represented together with linkages (340) between datacircles (300) in each group (A.B).

A grouping module is provided which is configured for defining relationships between the various datacircles (300) by reference to a grouping criteria which may include for instance a determination as to whether the coordinates defining the locations of a first and a second datacircle in the virtual space meet a threshold proximity relative to each other, and, a determination as to whether content associated with the hierarchical folder structures represented by the first and second datacircles meet a matching threshold. In these embodiments, the grouping module is embodied by a computer-readable program stored in the memory module (220) and operable by the processor unit (210). The grouping module may also define other parameters of relationships between various datacircles (300) and how the group relationships are displayed. For instance, the grouping module may be configured to define other parameters of the relationships between datacircles (300) in a group. By way of example, the group module may "lock" the relationship between grouped datacircles so that the relationship is maintained irrespective of how the datacircles and associated content are subsequently processed, moved or manipulated. Alternatively, the group module may be configured to define the group structure of datacircles in a group—that is, whether the datacircles are related by way of a tree structure, a bubble-shaped structure, a cellular structure, a hierarchical or lateral structure.

The graphical user interface (230) is configured for graphically representing on the display, in accordance with a map-view display mode, a representation of group relationship defined by the grouping module between any two or more datacircles which meet the grouping criteria. When operating in the map-view display mode, the datacircles defined as part of a defined group are displayed in collapsed or simplified form (e.g. as circular icons without any graphical elements representing first-level or second-level folders) and linkages between the datacircles are visually represented in the map-view for instance by a line (340) disposed between the collapsed representations of the first and the second datacircles on the display. Alternatively, the first and second datacircles defined as part of the group relationship may be automatically re-positioned in a cascading formation, or may otherwise in relatively close proximity to each other so as to signify a group relationship. Yet alternatively, the first and the second datacircles may be represented with common visual characteristic including a common colour, a common size or any combination thereof. Any number of different representations of the group relationship may be utilized in other embodiments including two-dimensional and three-dimensional representations (in other embodiments where XYZ coordinates rather than XY coordinates are assigned to datacircles). Also in the map view display mode the graphical user interface is configured to allow a user to copy or move nodes amongst datacircles.

Any given datacircles may also be associated with multiple groups concurrently depending upon different grouping criteria applied. The manner in which the datacircles respond and manner in which the datacircles are represented in the map view mode may therefore vary depending upon which particular group relationship they are part of and which particular group relationship is being represented on the display.

The graphical user interface (230) is configured to allow for automatic switching between the map-view display mode in which a relatively simplified or collapsed view of each datacircle forming part of a group relationship is depicted to the first display mode in which a relatively full and expanded representation of the datacircles are depicted. For instance, when operating in the map view display mode, any one of the datacircles shown in a grouped relationship may be selected by the user for instance tapping on the representation of one of the datacircles displayed on the touchscreen, whereby the graphical user interface is configured to automatically switch to the first display mode whereby the selected datacircle is represented in relatively full and expanded view.

Defined groupings of datacircles may also form entries that may be contained within nodes of any given datacircle, so as to give rise to a recursive type system. Advantageously, the recursive nature of the system allows for groups of datacircles to collapse and expand to and from larger groups or subgroups or datacircles. The behaviour mimics a representation of stars in a galaxy whereby when you click on a "star" (a circular graphical dot) in a background expands into planets (i.e. analogous to sub-groups or datacircles) within the galaxy. Click on another star in the background and that will zoom into and expand. It is a recursive system that works by creating layers of space defining foreground elements and background elements which correspond to the vertical nesting of sub-groups and groups. The reason why this is desirable is because of two reasons:

the user may want to define such ecosystems of data to represent large real world systems.

each hardware device will limit the amount of graphical data it can functionally represent. On the iPhone 6 for example, the current limit of datacircles displayed at one time is around 20. In order to create more datacircles, the graphical system creates layers of foreground and background so the maximum number of graphical elements shown stays the within a maximum range, but the graphics can represent different parts of a database that contains, for instance, 100 datacircles.

The recursive nature of groups may also be extended into depth by way of adding layers/planes of "existence", by way of setting up foreground and background layers. Defined groups of datacircles can existing in a plane of existence (which may be a 2d or a 3d environment), while other planes of existence might make themselves visible in the background. Double clicking on these background planes may bring the planes into the foreground, and hence the user can endlessly navigate through planes of existence by continuously clicking on background planes.

Advantageously, the visual relationship between different datacircles represented on the display by virtue of these embodiments—for instance by way of their relative distance, connections, assist the user in recalling the content and purpose of a datacircle based on the context within which it is represented on the display. For instance, if is positioned in the right corner, or next to 3 other circles, this may assist in providing useful triggers for the user to remember the content and purpose of a datacircle.

Advantageously, by assigning coordinates to the various datacircles, the datacircles are able to interact with other datacircles based on by reference to similar principles from the physical world, such as proximity, perspective, relative size, etc. Assigning coordinates to the datacircles also allows the datacircles to respond to context based triggers, such as if the coordinates of a datacircle match a physical coordinate, or if the datacircles is too close to another datacircles, it may for instance increase or decrease in size, based on an algorithm. It also means that closely packed data can trigger formation of group relationships amongst datacircles based on proximity. Furthermore, coordinates of datacircles may form legally enforceable and tradable assets, analogous to domain names wherein the proprietor of the datacircle owns the associated coordinates. In this regard, the datacircle is traded like real estate (i.e. real estate is sold not only as a house or as a building, but by the land it occupies. Analogous to this, the virtual coordinate is traded in a similar manner to land and may increase in value over time.

It would be appreciated that embodiments of the present invention may assist in providing at least one of the following advantages:

(I) the present invention may assist in representing data content of a computer system in a more emotive and memorable by providing the graphically represented data with personality and character whereby the user is able to more intuitively interact with the data compared to for instance navigating about a traditional folder structure. This intuitive interaction improves time taken for the user to recall the nature and purpose of various data represented by the computer system and to thereby interact with the data more expeditiously. As the data capacity of personal computer systems and devices accessed by users on a daily basis continues to grow over time, there is an increasing need to enable more efficient and simplified user interaction with large datasets.

(II) data in the computer system is encapsulated within a relatively neat graphical package. Touch gestures allow relatively immediate and direct ease of user-interaction with the graphical package to navigate about folders, subfolders and content stored therein defined by a database.

(III) the use of circular-shaped datacircles as the "encapsulating" graphic is perceived in certain cases as being a simplified shape compared to a cornered polygon such as a square or triangle. It is also multidirectional and contains centrality. This assists in bolstering an overall effect of "simplifying" the conception of data content in the computer system.

(IV) the present invention may assist in improving existing technology because there is currently a gap between data visualisation of relatively simple datasets and management of larger datasets. That is, currently most of the information stored in apps and more graphical ways of interacting with data are generally smaller datasets, non-nested information, like a few images, some text and links. In contrast, at the other end of the spectrum, complex document management systems do no focus on graphically representing data, but instead, they tend to focus upon on database and sharing efficiency and systemisation of data. Advantageously, the present invention assists in providing a relatively simple, efficient graphical visualisation approach suitable for user-interaction with relatively large datasets; and (V) the middle view element of the datacircles acts like a big easy-to-use "over-sized" control button, which further simplifies the user experience in interacting with large datasets in the computer system.

In embodiments of the present invention the graphical user interface is configured to allow customization of the appearance of graphical elements of the datacircles including layers, nodes, entries. Such customization may include defining customized images and text to represent such graphical elements in a personalized and memorable manner.

In certain embodiments of the present invention, a layer associated with one datacircle may be simultaneously associated with another datacircle, or a node associated with one layer may be simultaneously associated with one or more other layers of the same datacircle or of a different datacircle. In such embodiments, layers, nodes and entries are able to be instanced so that editing of any of these elements results in centralized updating of the layer, node and entry across the multiple locations to which the elements are associated. The instanced layer, node or entry may have unique identifiers or may have the same identifier. This will also be applicable to elements that are instanced and shared across different devices which may for instance be remotely connected via a communication network such as the Internet whereby the instanced elements will be centrally synched across devices in the network.

In certain embodiments of the present invention, when a layer, node or entry is dragged into the middle view element (310) of the datacircle (300), the processor unit may be configured to perform a processing operation upon the contented represented by the dragged layer, node or entry in question. The processing function that is performed may for instatnce be indicated by an icon, image, text or symbol that is currently represented by the middle view element (310). For instance, if the middle view element (310) shows a lock screen icon, and if a node is dragged into on to the middle view element (310), the dragged node is able to be individually and selectively locked without the rest of the elements of the data necessarily being locked as well. Similarly, if the middle view element (310) is showing a share screen icon, pressing the share button normally shares the entire datacircle. However, in certain embodiments, by dragging a node on to the middle view element, only that specific node is able to be shared without necessarily sharing all elements of the datacircle.

In certain embodiments, the datacircle is configured to resemble and function as a big user-interactive control button. Additionally, the middle view element (310) when functioning as a big control button and actuated by a user, may be configured to "predict" the intended function required by the user. In seeking to provide this predictive capability, a record of each user-interaction associated with the datacircle is recorded. This record of user-interactions with the datacircle may provide a statistical basis for predicting the likely function required by the user when actuating the middle view element (310) of the datacircle. Additionally, other factors such as the location of the smartphone device, the time of the day, ambient noise, motion, last recorded activity, and/or cross matches with the list of recorded activities and their corresponding contexts may also be referenced by the processor unit in predicting what function to perform. By way of example, if a datacircle mostly contains entries indicative of websites, and they are generally only briefly opened and discarded quickly, then the datacircle may notes itself as a web browser, and clicking on the main button will do several actions:

1. creates a new search website
2. deletes any old ones
3. keeps the minimum size of node icon to optimal size intended for casual web browsing If the datacircle has recorded predominantly documents such as pdfs etc, then its nodes will be kept as text nodes and will act like folders rather than icons. If the datacircle detects that it is late at night and the datacircle contains a few alarm nodes, then it will offer to open the alarm function. If the location of the device upon which the datacircle is displayed is detect to be at home during a time when children are reading or singing, it will offer the video or photo function.

Backgrounds will be used as contexts for the datacircles. What this means is likened to a physical object. An orange sits in bowl or a baseball bat on a baseball field. The objects are expected to do different things in different contexts. So, a datacircle is expected to do allow different processing functions when a photo is placed in the background versus a map. For example, a photo can be placed in the background and the datacircle simply performs as normal. The user can change the background to a map, and the user can further define a geographical location for the datacircle. If the map background is switched to "Active", whether or not the actual background image is a photo or map, the datacircle will alert the user once the device is within the proximity of that map's location. If the background is set to an Augmented Reality (AR) camera and an AR object is detected, the datacircle will perform a predetermined action related to the trigger. If a group of datacircles have a map background, the datacircles will rearrange according to predefined coordinates, like coordinates at creation. If the group of datacircles have a background which is a 3d model, the datacircles will re-arrrange to preset points on the model.

The 3d model can be navigated with the datacircles following the movements

Those skilled in the art will appreciate that the invention described herein is susceptible to variations and modifications other than those specifically described without departing from the scope of the invention. All such variations and modification which become apparent to persons skilled in the art, should be considered to fall within the spirit and scope of the invention as broadly hereinbefore described. It is to be understood that the invention includes all such variations and modifications. The invention also includes all of the steps and features, referred or indicated in the specification, individually or collectively, and any and all combinations of any two or more of said steps or features.

The reference to any prior art in this specification is not, and should not be taken as, an acknowledgment or any form of suggestion that that prior art forms part of the common general knowledge.

I claim:

1. A computer system including:
   a memory containing a plurality of electronic files;
   a processor configured for processing any one of the plurality of electronic files; and
   a display;
   said memory including a program stored thereon configured for execution by the processor to provide a graphical user interface operable on the display, the graphical user interface being configured for graphically representing on the display, in accordance with a first display mode, a representation of a hierarchical folder structure comprising at least one first-level folder and at least one second-level folder associated with the at least one first-level folder, and at least one of said plurality of electronic files being associated with at least one of the first-level folder and the second-level folder, the representation of the hierarchical folder structure including:
   (i) a first indicia configured as a control interface for controllably navigating about and interacting with the hierarchical folder structure; wherein the first indicia is a circle-shaped graphical element;
   (ii) at least one second indicia indicative of the at least one first-level folder, the second indicia surrounding at least a portion of the first indicia on the display; and
   (iii) a third indicia indicative of the at least one second-level folder, the third indicia including at least one of a text and a graphic disposed substantially radially outwardly from a central region of the first indicia represented on the display; wherein the third indicia comprises sub-folders of the second indicia, and entries associated with the second indicia and the third indicia; the entries comprises electronic data and program files;
   when the third indicia is selected by a user via the graphical user interface, the entries associated with the third indicia is displayed in scrolling format in the first indicia that are surrounded by the second indicia;
   wherein when there is at least two second indicias, each of the second indicias are displayed as a separate concentric circle layer surrounding at least a portion of the first indicia on the display along with at least one of the third indicia disposed substantially radially outward from the central region of the first indicia;

when there is only one second indicia, the second indicia is not displayed on the display and the display displays at least one of the third indicia disposed substantially radially outward from the central region of the first indicia.

2. The computer system according to claim 1, wherein the second indicia graphically representing the at least one first-level folder includes at least a portion of a circular-shape.

3. The computer system according to claim 1, wherein the plurality of second indicias are displayed in a substantially concentric formation relative to the respective first indicia.

4. The computer system according to claim 1, wherein the first indicia further includes a customisable image.

5. The computer system according to claim 1, wherein the hierarchical folder structure includes a plurality of first-level folders, each of said plurality of first-level folders being graphically represented by the graphical user interface on the display by corresponding second indicias, and said corresponding second indicias being arranged to surround at least a portion of the respective first indicia on the display.

6. The computer system according to claim 5, wherein the graphical user interface is configured to highlight a second indicia representing a first-level folder which is currently selected on the graphic user interface, the said highlight including at least one of scaling the second indicia representing the first-level folder currently selected and positioning the second indicia representing the first-level folder currently selected to an outer-most position within the concentric formation of second indicias relative to the first indicia.

7. The computer system according to claim 1, wherein the display includes a touchscreen display, and a portion of the touchscreen display upon which the first indicia is represented is configured to function as the user-interactive control interface responsive to touch-activated control inputs.

8. The computer system according to claim 1, wherein the control interface, in response to a sensed user-control input, is configured to allow navigation about the at least one first-level folder and the at least one second-level folder of the hierarchical folder structure represented by the second indicia and third indicia respectively on the display, and to allow processing of at least one of the plurality of electronic files associated with at least one of the first-level folder and the at least one second-level folder during navigation, whereby said processing includes processing the at least one electronic file via a compatible program executable by the processor.

9. The computer system according to claim 1, wherein the graphical user interface is configured for graphically representing on the display a plurality of representations of hierarchical folder structures each comprising at least one first-level folder and at least one second-level folder associated with the at least one first-level folder, at least one of said plurality of electronic files being associated with at least one of the first-level folder and the second-level folder, each of said plurality of hierarchical folder structures including coordinates associated therewith for defining locations of the representations of the hierarchical folder structures relative to a virtual space; and the processor being configured for defining, by reference to a grouping criteria, a group relationship between at least a first and a second representation of a hierarchical folder structure from amongst the plurality of representations of hierarchical folder structures:

wherein the grouping criteria includes at least one of:
(i) the coordinates defining the locations of the first and second representations of hierarchical folder structures in the virtual space meeting a threshold proximity relative to each other; and
(ii) content associated with the hierarchical folder structures represented by the first and second representations meeting a matching threshold.

10. The computer system according to claim 9, wherein the graphical user interface is configured for graphically representing on the display, in accordance with a second display mode, a representation of the group relationship defined by the grouping module between the first and second representations of the hierarchical folder structures, including at least one of:
(i) a line or graphic disposed between the first and the second representations of the hierarchical folder structures on the display;
(ii) the first and the second representations of the hierarchical folder structures being positioned in relative proximity to each other;
(iii) the first and the second representations of the hierarchical folder structures being displayed with common visual characteristic including at least one of a common colour and a common size.

11. The computer system according to claim 10 wherein when operating in the second display mode the first and second representations of the hierarchical folder structures defined in the group relationship are represented in a relatively collapsed form on the display and are able to be user-selected via the graphical user interface, whereby in response to user selection, the graphical user interface is configured to switch to the first display mode whereby the selected first and second representations of the hierarchical folder structures are represented in a relatively expanded form.

12. The computer system according to claim 10 embodied in a mobile computing device including at least one of a smartphone, a laptop computer, and a tablet-type computing device.

13. The computer system according to claim 10, wherein:
(i) the graphical user interface is configured to allow user-interactive dragging of at least one of the second indicia, the third indicia, and an indicia representing at least one of the plurality of electronic files in to proximity with the first indicia; and
(ii) the processor unit is configured for performing a processing function upon the content represented by the at least one of the second indicia, the third indicia, and the indicia representing at least one of the plurality of electronic files that is dragged in to proximity with the first indicia;

whereby the processing function that is performed includes a function that is represented by an icon, text image, or symbol displayed by the first indicia.

14. A display method, the method includes a processor executing a program stored in a memory to provide a graphical user interface operable on the display, the graphical user interface being configured for graphically representing on the display, in accordance with a first display mode, a representation of a hierarchical folder structure comprising at least one first-level folder and at least one second-level folder associated with the at least one first-level folder, and at least one of said plurality of electronic files being associated with at least one of the first-level folder and the second-level folder, the representation of the hierarchical folder structure including:
(i) a first indicia configured as a control interface for controllably navigating about and interacting with the hierarchical folder structure; wherein the first indicia is a circle-shaped graphical element;
(ii) a second indicia indicative of the at least one first-level folder, the second indicia surrounding at least a portion of the first indicia on the display; and
(iii) a third indicia indicative of the at least one second-level folder, the third indicia including at least one of a text and a graphic disposed substantially radially outwardly from a region of the first indicia represented on the display; wherein the third indicia comprises sub-folders of the second indicia, and entries associated with the second indicia and the third indicia; the entries comprises electronic data and program files;
when the third indicia is selected by a user via the graphical user interface, the entries associated with the third indicia is displayed in scrolling format in the first indicia that are surrounded by the second indicia;
wherein when there is at least two second indicias, each of the second indicias are displayed as a separate concentric circle layer surrounding at least a portion of the first indicia on the display along with at least one of the third indicia disposed substantially radially outward from the central region of the first indicia;
when there is only one second indicia, the second indicia is not displayed on the display.

15. The method according to claim 14, wherein the first indicia further includes a customisable image.

16. The method according to claim 14, wherein the second indicia graphically representing the at least one first-level folder includes at least a portion of a circular-shape.

17. The method according to claim 14, wherein the hierarchical folder structure includes a plurality of first-level folders, each of said plurality of first-level folders being graphically represented by the graphical user interface on the display by corresponding second indicias, and said corresponding second indicias being arranged to surround at least a portion of the respective first indicia on the display.

18. The method according to claim 17, wherein the graphical user interface is configured to highlight a second indicia representing a first-level folder which is currently selected on the graphic user interface, the said highlight including at least one of scaling the second indicia representing the first-level folder currently selected and positioning the second indicia representing the first-level folder currently selected to an outer-most position within the concentric formation of second indicias relative to the first indicia.

19. The method according to claim 14, wherein the plurality of second indicias are displayed in a substantially concentric formation relative to the respective first indicia.

20. The method according to claim 14, wherein the display includes a touchscreen display, and a portion of the touchscreen display upon which the first indicia is represented is configured to function as the user-interactive control interface responsive to touch-activated control inputs.

21. The method according to claim 14, wherein the control interface, in response to a sensed user-control input, is configured to allow navigation about the at least one first-level folder and the at least one second-level folder of the hierarchical folder structure represented by the second indicia and third indicia respectively on the display, and to allow processing of at least one of the plurality of electronic files associated with at least one of the first-level folder and the at least one second-level folder during navigation, whereby said processing includes processing the at least one electronic file via a compatible program executable by the processor.

22. The method according to claim 14, wherein the graphical user interface is configured for graphically representing on the display a plurality of representations of hierarchical folder structures each comprising at least one first-level folder and at least one second-level folder associated with the at least one first-level folder, at least one of said plurality of electronic files being associated with at least one of the first-level folder and the second-level folder, each of said plurality of hierarchical folder structures including coordinates associated therewith for defining locations of the representations of the hierarchical folder structures relative to a virtual space; and
the processor being configured for defining, by reference to a grouping criteria, a group relationship between at least a first and a second representation of a hierarchical folder structure from amongst the plurality of representations of hierarchical folder structures:
wherein the grouping criteria includes at least one of:
(iii) the coordinates defining the locations of the first and second representations of hierarchical folder structures in the virtual space meeting a threshold proximity relative to each other; and
(iv) content associated with the hierarchical folder structures represented by the first and second representations meeting a matching threshold.

23. The method according to claim 22, wherein the graphical user interface is configured for graphically representing on the display, in accordance with a second display mode, a representation of the group relationship defined by the grouping module between the first and second representations of the hierarchical folder structures, including at least one of:
(i) a line or graphic disposed between the first and the second representations of the hierarchical folder structures on the display;
(ii) the first and the second representations of the hierarchical folder structures being positioned in relative proximity to each other;
(iii) the first and the second representations of the hierarchical folder structures being displayed with common visual characteristic including at least one of a common colour and a common size.

24. The method according to claim 23, wherein when operating in the second display mode the first and second representations of the hierarchical folder structures defined in the group relationship are represented in a relatively collapsed form on the display and are able to be user-selected via the graphical user interface, whereby in response to user selection, the graphical user interface is configured to switch to the first display mode whereby the selected first and second representations of the hierarchical folder structures are represented in a relatively expanded form.

25. The method according to claim 14, wherein the computer system is configured to provide the following steps of:
(i) allowing user-interactive dragging via the graphical user interface of at least one of the second indicia, the third indicia, and an indicia representing at least one of the plurality of electronic files in to proximity with the first indicia; and (ii) the processor unit performing a processing function upon the content represented by the at least one of the second indicia, the third indicia, and the indicia representing at least one of the plurality of electronic files that is dragged in to proximity with the first indicia;

whereby the processing function that is performed includes a function that is represented by an icon, text, image, or symbol displayed by the first indicia.

* * * * *